UNITED STATES PATENT OFFICE.

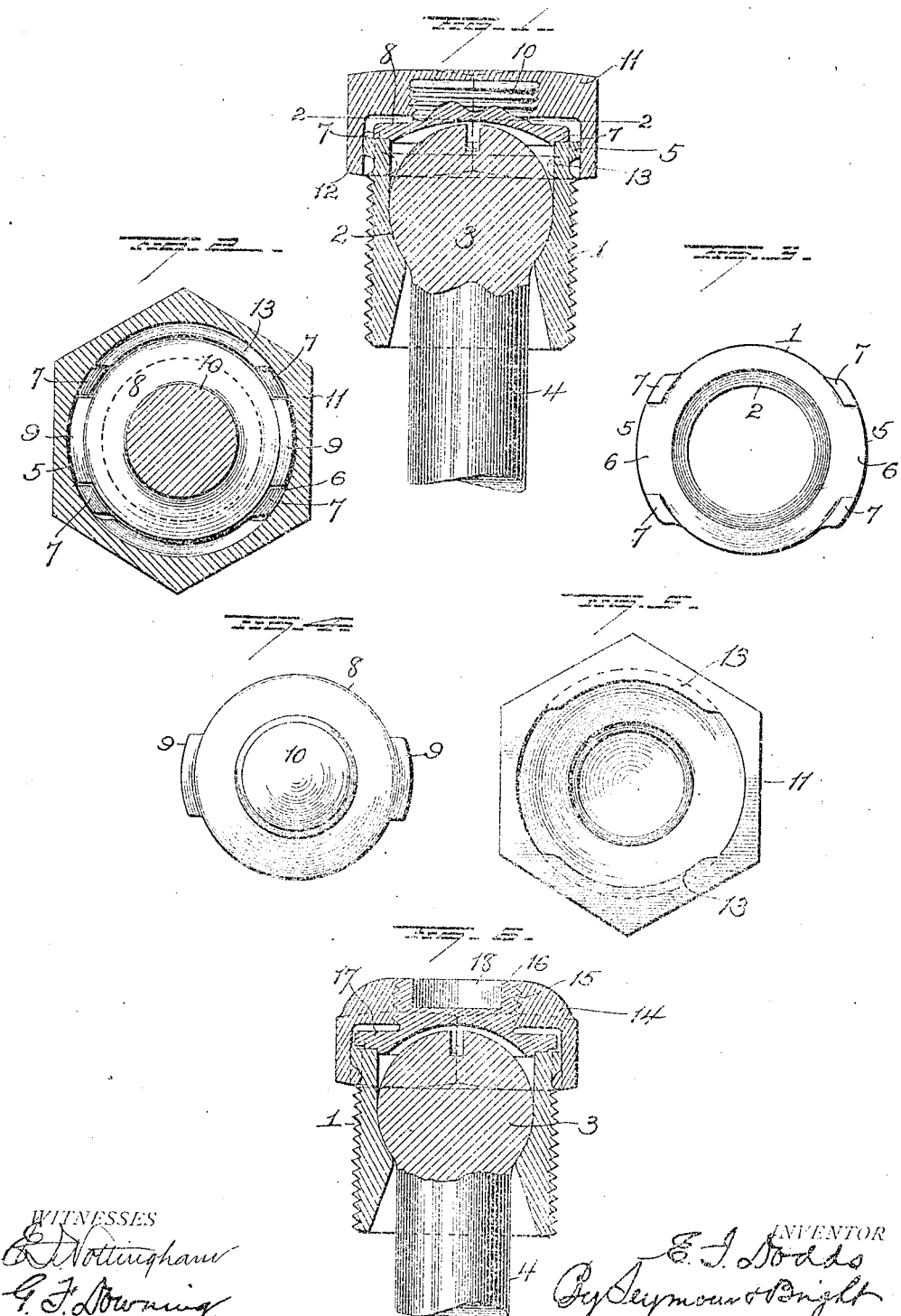

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,291,789.  Specification of Letters Patent.  Patented Jan. 21, 1919.

Application filed April 26, 1918. Serial No. 230,912.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers, and more particularly to means for closing the outer end of the bearing sleeve,—the object of the present invention being to provide a simple and efficient closure for the bearing sleeve, which can be quickly removed to expose the head of the bolt for testing purposes; which can be as quickly replaced, and which will operate normally to maintain the outer end of the bearing sleeve tightly closed.

With this and other objects in view, the invention consists in certain novel features of construction and combinations of parts as hereinafter set forth and pointed out in the claim.

In the accompanying drawings; Figure 1 is a longitudinal sectional view of a staybolt structure showing an embodiment of my invention; Fig. 2 is a transverse sectional view on the line 2—2 of Fig. 1; Fig. 3 is an end view of the bearing sleeve; Fig. 4 is a separate view of the cap; Fig. 5 a bottom plan view of the head or cap-carrier, and Fig. 6 is a view of a modification.

1 represents a bearing sleeve adapted for connection with a boiler sheet and provided interiorly with a curved face 2 constituting a bearing for the rounded or spherical head 3 of a staybolt 4.

The bearing sleeve 1 is provided at its outer end with lateral flanges 5 and the outer face of each of these flanges is made with recesses 6 forming spaced shoulders or stops 7.

A cap or closure 8 is seated on the end of the bearing sleeve 1 and is provided with lugs 9 to overlie the flanges 5 and become disposed in the recesses 6 therein and between the shoulders or stops 7 formed by said recesses. The cap 8 is provided on its top with a shank 10 which is externally threaded with left hand screw threads to enter a threaded socket in a head 11. This head constitutes a carrier for the cap or closure and may have a hexagonal or other angular external configuration to receive a wrench. The head 11 is made with an apron portion 12 to encircle the outer end portion of the bearing sleeve and it is provided interiorly with flanges 13 to enter behind the flanges 5.

Instead of making the cap carrier in the form of a cover extending over the shank of the cap, a cap carrier 14, Fig. 5, may be made with a hole having its wall threaded as at 15 to receive the threaded shank 16 of the cap or closure 17, and said shank may be provided with an angular socket 18 to receive a wrench.

In assembling the devices and applying them to the bearing sleeve, the cap and its shank may be inserted into the head or carrier 11 and the shank screwed into the socket of the latter until it approximately reaches the end of said socket. The head or carrier will then be placed on the end of the bearing sleeve and turned in a right-hand direction to bring the internal flanges 13 of said head or carrier behind the flanges 5 on the bearing sleeve. When the head or carrier is thus turned, the cap or closure 8 will turn with it and the lugs 9 on said cap or closure will become disposed in the recesses 6 between the shoulders 7 on the flanges 5. Further turning of the head or carrier to the right will result in tending to unscrew the same from the shank on the cap, but as the head cannot move outwardly, by reason of engagement of the lugs 9 of the head with the flanges 5 of the bearing sleeve, and as the cap cannot turn by reason of the engagement of its lugs 9 with the shoulders 7 on the flanges 9, and the result is that such further turning of the head or carrier will cause the cap or closure to be tightened down on its seat on the bearing sleeve, by reason of the left-hand screw threaded connection of the cap or closure with the head or carrier.

It is apparent that by a reversal of the operations above described, the cap or closure and its head or carrier will be unlocked and may be quickly removed to expose the head of the staybolt for testing purposes.

Having fully described my invention what I claim as new and desire to secure by Letters-Patent, is:—

In a staybolt structure, the combination with a bearing sleeve having lateral flanges provided with stops on their outer faces, of a cap or closure to seat on said bearing sleeve and having lugs to overlie the flanges on the bearing sleeve and engage the stops on the same, said cap or closure having a threaded shank, and a head or carrier internally threaded to receive said shank and having an apron portion encircling the outer end portion of the bearing sleeve, said apron portion of the head or carrier having internal flanges to enter behind the flanges on the bearing sleeve.

In testimony whereof, I have signed this specification in the presence of two subscribing witnesses.

ETHAN I. DODDS.

Witnesses:
S. G. NOTTINGHAM,
R. S. FERGUSON.